G. O. MAULSBY.
PEANUT HARVESTER AND SHOCKER.
APPLICATION FILED NOV. 30, 1918.
1,381,211.
Patented June 14, 1921.
3 SHEETS—SHEET 1.
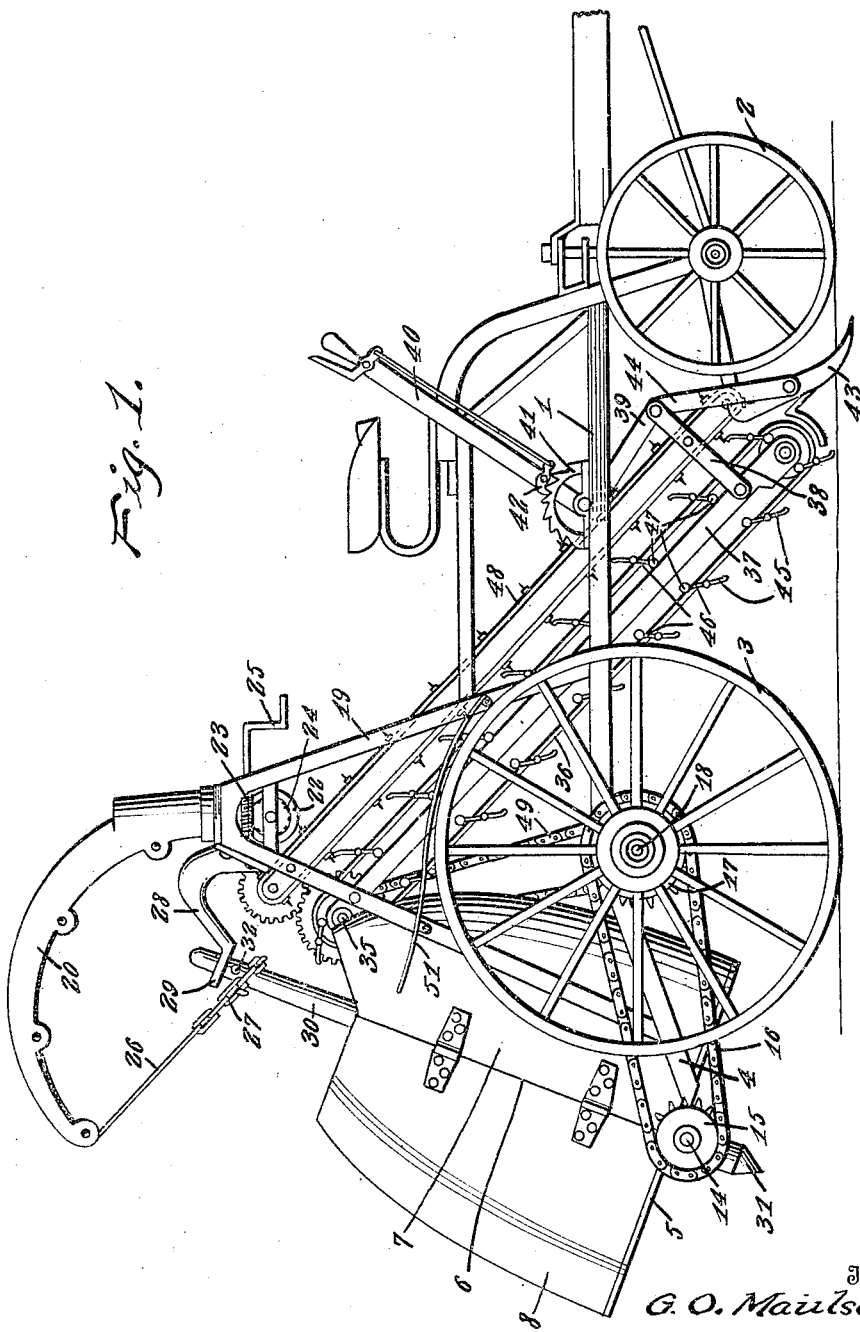
Witness
Geo Walling
Inventor
G. O. Maulsby,
By C. A. Snow & Co.
Attorneys

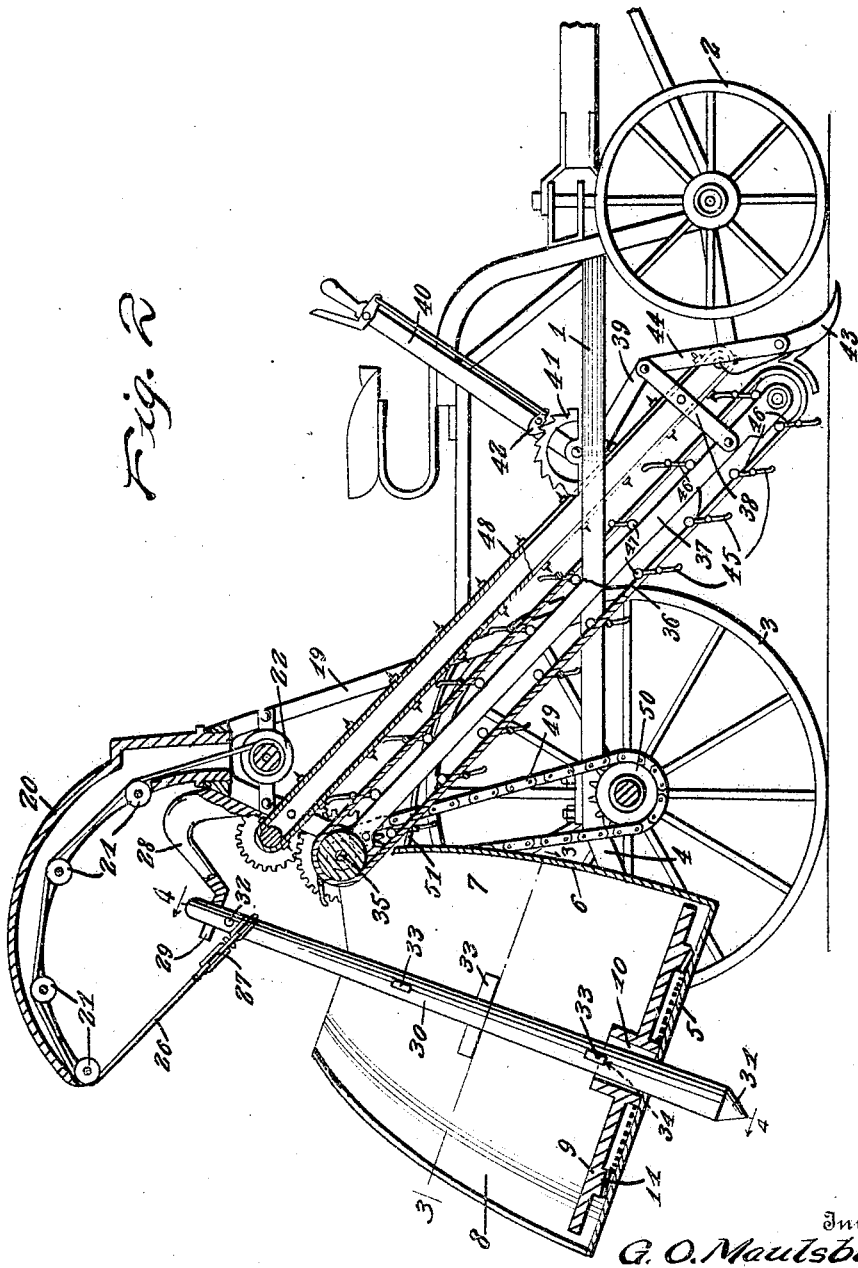

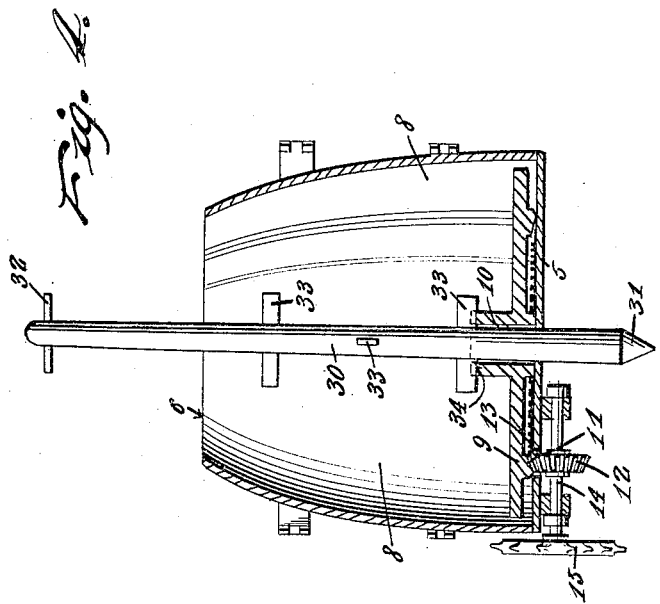
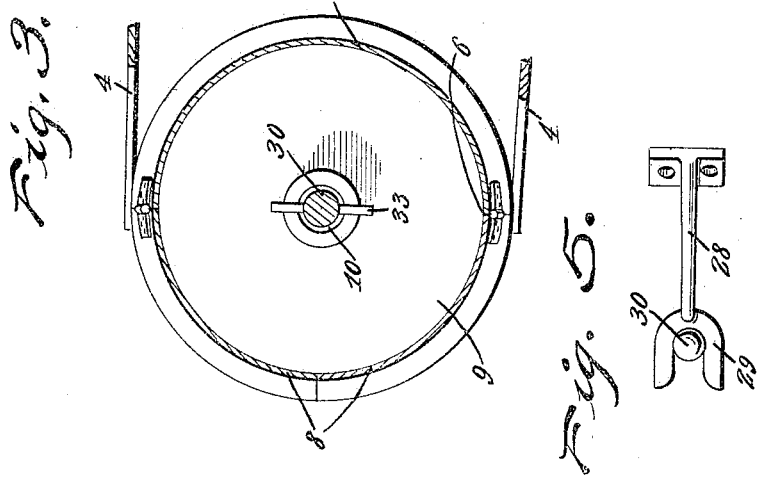

UNITED STATES PATENT OFFICE.

GILBERT O. MAULSBY, OF BIRMINGHAM, ALABAMA.

PEANUT HARVESTER AND SHOCKER.

1,381,211.  Specification of Letters Patent.  Patented June 14, 1921.

Application filed November 30, 1918. Serial No. 264,833.

*To all whom it may concern:*

Be it known that I, GILBERT O. MAULSBY, a citizen of the United States, residing at Birmingham, in the county of Jefferson and State of Alabama, have invented a new and useful Peanut Harvester and Shocker, of which the following is a specification.

This invention relates to machines for harvesting peanuts and for shocking the vines while the nuts are adhering thereto, one of the objects of the invention being to provide a winding mechanism whereby the harvested vines will be wrapped about a central member into substantially conical form and the shock thus produced be subsequently removed and left standing on the ground with said central member projecting into the ground and supporting the shock in upstanding position.

Another object is to provide a mechanism for shocking which is simple, light and compact and can be handled readily.

Another object is to provide efficient means for removing the completed shock and depositing it upon the ground.

Another object is to provide improved means for elevating the vines and nuts to the shocking mechanism, said means operating efficiently in windy weather to prevent the vines from being scattered.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of parts without departing from the spirit or sacrificing any of the advantages of the invention as set forth in the appended claims.

In the accompanying drawings the preferred form of the invention has been shown.

In said drawings—

Figure 1 is a side elevation of the machine.

Fig. 2 is a vertical longitudinal section therethrough.

Fig. 3 is a section on line 3—3, Fig. 2.

Fig. 4 is a section on line 4—4 of Fig. 2.

Fig. 5 is a plan view of the post centering bracket.

Referring to the figures by characters of reference, 1 designates the frame of the machine supported by front wheels 2 and rear wheels 3 and provided with downwardly inclined rear extensions 4 to which is secured the circular bottom 5 of a substantially frusto-conical shocker casing 6 which is inclined upwardly and forwardly, as shown. This casing is preferably formed of a front section extending through approximately 180° and of two rear doors, the front section being indicated at 7 and the doors at 8. The doors, when open, expose the entire contents of the casing 6 and allow them to be removed bodily through the door opening.

Mounted for rotation upon the bottom of the casing 6 is a table 9 provided with a central opening 10 and having a gear 11 on the bottom thereof. This gear meshes with a small drive gear 12 extending through an opening 13 in the bottom 5 and secured to a transverse shaft 14 supported from said bottom. A sprocket 15 is secured to the shaft and receives motion through a chain 16 from a sprocket 17 secured to and rotating with the axle 18 of the wheels 3.

A frame 19 is mounted on and extends upwardly from the rear portion of frame 1 and supports an arcuate hollow arm 20 which overhangs the casing 6 and is provided therein with guide sheaves 21. A spool 22 is journaled in the frame 19 near the base of arm 20 and is adapted to be rotated by a worm 23 engaging a gear 24 secured to the spool, said worm having a crank arm 25 or the like whereby it can be rotated readily. A cable 26 is secured to and adapted to be wound on the spool and is supported by the sheaves in the arm 20, this cable extending beyond the end of the arm and preferably provided with a short chain 27 at its free end. A bracket 28 extends rearwardly from the frame 19 and over the casing 6 and has a terminal fork 29.

Removably mounted in the opening 10 in table 9 is a stake or post 30 having a pointed lower end 31 which projects downwardly through the bottom 5, the upper end of the post being removably mounted in the fork 29 and provided with a transverse pin 32. Fingers 33 are extended radially from the post at points within the casing 6 and, if desired, the lower fingers can rest in notches in the central portion of the table 7, as shown at 34, thus to key the post to the bottom.

A transverse shaft 35 is journaled on the frame 19 above the casing 6 and supports the upper portion of an endless elevator 36 arranged within a downwardly and forwardly inclined frame 37. The lower portion of the frame is supported by links 38 from one arm 39 of a bell crank lever, the other arm 40 of which constitutes a hand lever as shown and is provided with suitable locking means, such as a toothed segment 41 and a dog 42. A digger 43 of any desired construction is arranged in front of the elevator and is connected by links 44 to the arm 39.

The elevator 36 is preferably provided with fingers 45 pivotally connected thereto and having extensions 46 carrying rollers 47. These rollers are adapted, during the upward movement of the fingers, to roll along the frame 37 and thus hold the fingers projected positively in an upward direction. However when the fingers are carried under the frame 37 at the upper end thereof, they will become released from the sides of the frame 37 and will hang freely, as shown.

For the purpose of preventing the material which is being elevated, from being blown off of the elevator, another endless carrier 48 is arranged above and substantially parallel with the elevator 36 and both the elevator 36 and the carrier 48 are driven in any suitable manner, as by means of chains 49 driven by a sprocket 50 on the axle 18.

When the machine is moved forward the table 9 will be rotated slowly and the elevator will be actuated. The peanuts will be dug up by the digger 43 and the vines and nuts will move upwardly between the elevator and carrier and be delivered into the open upper end of the casing 6. They will here be engaged by the fingers 33 and caused to wrap around the rotating post and such wrapping will continue until the post is surrounded by a shock which fills the casing. The operator then attaches the chain 27 to the post 30 below the pin 32 and opens the doors. By then rotating the spool 22 the cable 26 will be wound thereon and the post pulled upwardly from the table 9. The said post, with the shock adhering thereto, can then be swung from the casing 6 and lowered, pointed end lowermost, to the ground by reversing the rotation of the crank arm 25 whereupon the said end can be driven into the ground and the shock left standing. Another post can quickly be substituted for the one removed, the doors 8 closed, and the operation repeated as described. By means of the lever 40 the elevator and digger can be adjusted to any desired level, as will be apparent.

A guard 51 can be extended over each of the rear wheels and the operator can stand on one of them when handling the shock.

What is claimed is:

1. In a vine shocking machine the combination with an inclined casing open at the top and including hingedly connected sections, and a table mounted for rotation on the bottom of the casing, of a post removably mounted within and extending through the table and the bottom of the casing and adapted to be rotated by the table, said post having its lower end pointed, outwardly extending vine engaging members upon the post, a forked bearing for the upper end of the post, an arm mounted for lateral swinging movement and normally overhanging the casing, means supported by the arm for lifting the post out of the table and suspending it from the arm, means for rotating the arm with the post suspended therefrom, and means for lowering the post to direct the pointed end thereof into the ground.

2. In a vine shocking machine a portable structure, a casing carried thereby and including hingedly connected sections, a table mounted for rotation on the bottom of the casing, a post extending through the table and the bottom of the casing and having its lower end pointed, said post being revoluble with the table, vine engaging elements extending from the post, a forked bearing for the upper end portion of the post for supporting the post in inclined position, means for gathering vines and feeding them into the casing, an arm normally overhanging the casing, means carried by the arm for lifting the post out of the casing and for lowering said post to direct its pointed end into the ground, said arm being adapted to swing laterally while supporting the post.

3. In a vine shocking machine a portable structure, a casing carried thereby, a table rotatable in the casing, a post insertible through the table and the bottom of the casing and removable therefrom, said post having a pointed lower end, a frame upon said structure, an arcuate channeled arm having a tubular end portion journaled in the frame, guide sheaves within the channeled arm, a flexible member within the arm and on the sheaves, one end of said member extending through the tubular end portion of the arm, means for connecting the other end of said flexible member to the post, and means for actuating the flexible member to lift the post out of the casing and to deposit said post pointed end lowermost onto the ground.

In testimony that I claim the foregoing as my own, I have hereto affixed my signature in the presence of two witnesses.

GILBERT O. MAULSBY.

Witnesses:
L. V. MORRILL,
DOUSIE R. MAULSBY.